United States Patent
Dickinger et al.

(10) Patent No.: US 8,398,512 B2
(45) Date of Patent: Mar. 19, 2013

(54) TOOTHED BELT PULLEY

(75) Inventors: Karl Dickinger, Vorchdorf (AT);
Herbert Schmid, Vorchdorf (AT);
Wolfgang Siessl, Traunkirchen (AT)

(73) Assignee: Miba Sinter Austria GmbH, Laakirchen (AT)

( * ) Notice: Subject to any disclaimer, the term of this patent is extended or adjusted under 35 U.S.C. 154(b) by 1039 days.

(21) Appl. No.: 12/150,512

(22) Filed: Apr. 29, 2008

(65) Prior Publication Data

US 2009/0093328 A1    Apr. 9, 2009

(30) Foreign Application Priority Data

Apr. 30, 2007    (AT) .................................. A 673/2007

(51) Int. Cl.
*F16H 55/36*    (2006.01)
(52) U.S. Cl. ............................ 474/188; 474/93; 474/164
(58) Field of Classification Search .................. 474/188, 474/189, 166, 168, 169, 174, 175, 176, 93, 474/152, 153, 164, 204, 273, 902
See application file for complete search history.

(56) References Cited

U.S. PATENT DOCUMENTS

| | | | | |
|---|---|---|---|---|
| 440,040 | A | * | 11/1890 | Jones ............................ 474/188 |
| 605,104 | A | * | 6/1898 | Knoblock ..................... 474/188 |
| 3,429,700 | A | * | 2/1969 | Salter et al. ....................... 419/6 |
| 4,013,142 | A | * | 3/1977 | Hagg ............................ 187/254 |
| 4,545,778 | A | * | 10/1985 | Koivula ........................ 474/153 |
| 4,622,748 | A | * | 11/1986 | Binder et al. ................... 30/380 |
| 4,810,237 | A | * | 3/1989 | Mantovaara ................... 474/166 |
| 4,944,714 | A | * | 7/1990 | Storck .............................. 474/91 |
| 4,986,795 | A | * | 1/1991 | Storck .............................. 474/91 |
| 5,417,617 | A | | 5/1995 | Milton |
| 6,099,427 | A | * | 8/2000 | Brown .......................... 474/188 |

FOREIGN PATENT DOCUMENTS

| | | |
|---|---|---|
| DE | 31 24 320 | 1/1983 |
| DE | 40 11 813 | 10/1990 |
| GB | 2 114 260 | 8/1983 |
| GB | 2 116 289 | 9/1983 |
| JP | 61-093654 | 6/1986 |
| JP | 10-132061 | 5/1998 |
| JP | 2006-226215 | 8/2006 |

OTHER PUBLICATIONS

European Search Report dated Apr. 8, 2009 with English translation of the relevant portion.
Austrian Office Action (with English translation of relevant part), Oct. 2007.
Statement concerning standards SINT E 35, SINT E 36, and SINT E 39 (2011).

* cited by examiner

*Primary Examiner* — William A Rivera
(74) *Attorney, Agent, or Firm* — Collard & Roe, P.C.

(57) ABSTRACT

The invention describes a belt pulley (1) for a wet belt application, with a pulley body (2) comprising toothing (5) incorporating teeth (6) on an end face (4) for a toothed belt, and a tooth gap (7) with a tooth gap base (12) is disposed between every two teeth (6), and optionally with at least one flange (3), which is disposed—in the axial direction—on the side of the pulley body (2) and extends beyond the toothing (5) in the radial direction. Grooves (9) are provided in the region of the tooth gap base (12) and/or on an inner surface (8) of the flange (3) facing the toothing (5) for feeding away a lubricant.

8 Claims, 8 Drawing Sheets

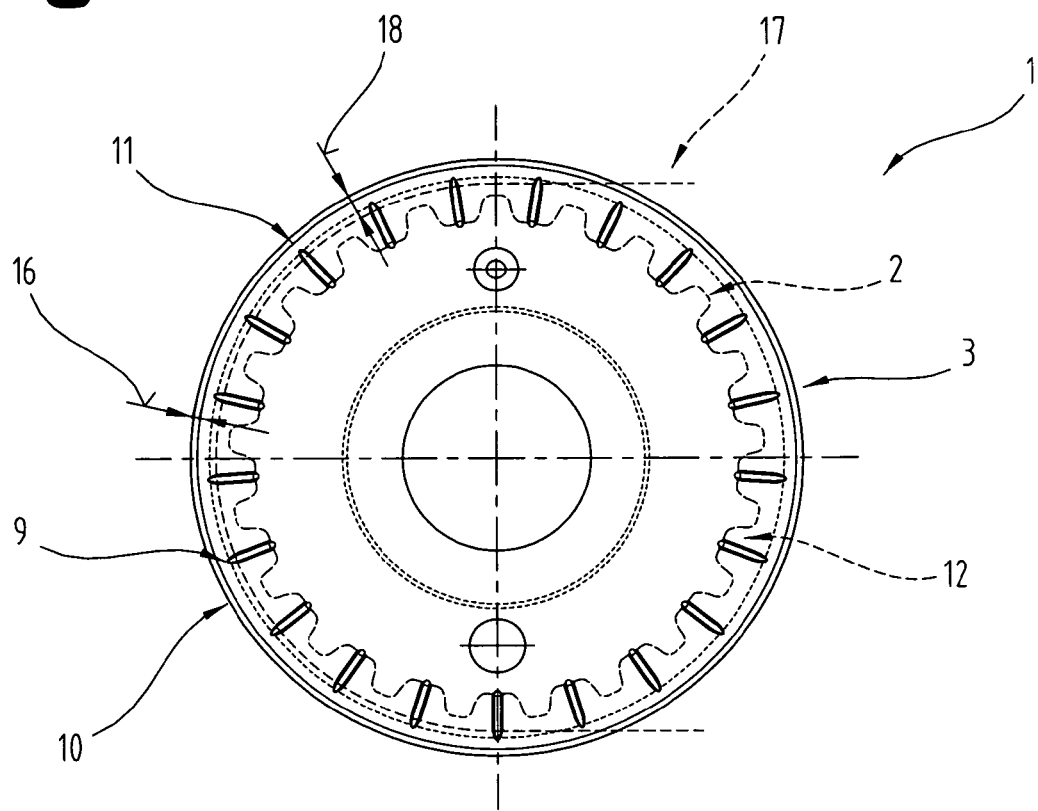
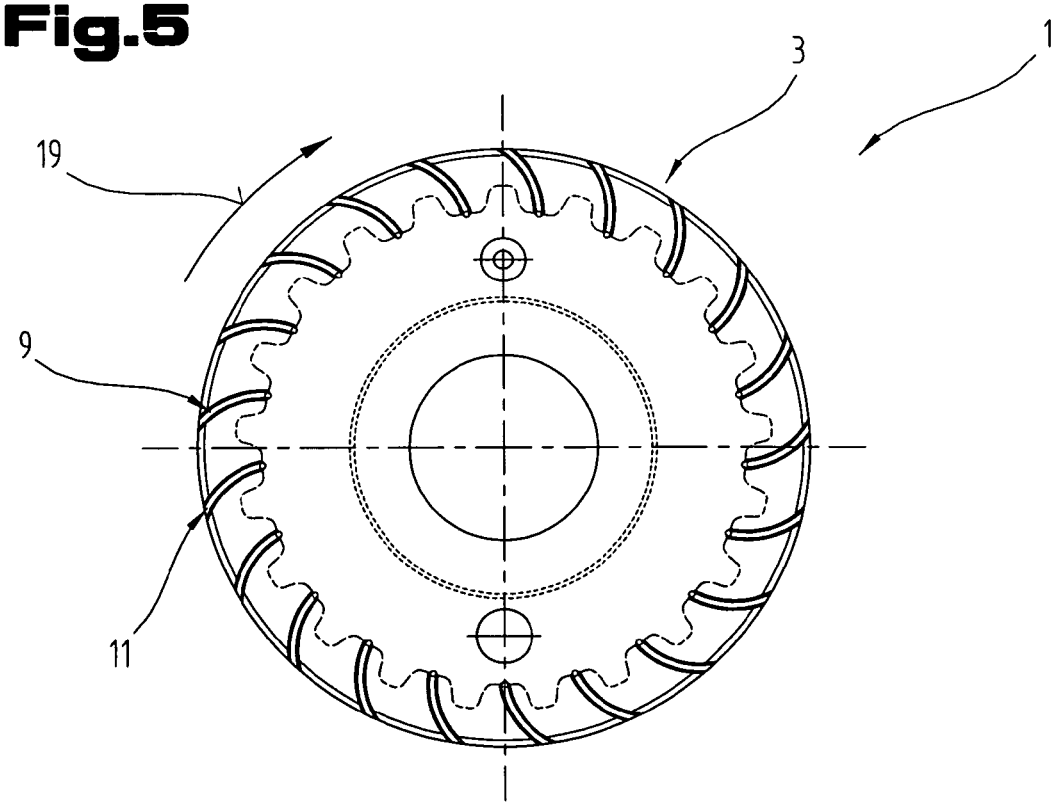

TOOTHED BELT PULLEY

CROSS REFERENCE TO RELATED APPLICATIONS

Applicants claim priority under 35 U.S.C. §119 of AUSTRIAN Patent Application No. A 673/2007 filed on Apr. 30, 2007.

BACKGROUND OF THE INVENTION

1. Field of the Invention

The invention relates to a pulley for a toothed belt for a wet belt application, with a pulley body with toothing incorporating teeth for a toothed belt, a tooth gap with a tooth gap base being disposed between every two teeth, and optionally with at least one flange which is disposed on the side—in the axial direction—of the pulley body, and which extends beyond the toothing in the radial direction.

2. Prior Art

Toothed belt drives are used in motors as a means of synchronously coupling several mutually spaced shafts by means of toothed belts or generally as a means of enabling drive energy to be transmitted from one shaft to a shaft that is independent of it. As a result, it is possible to drive several mutually independent shafts by means of a motor. More than two shafts can be driven by means of a single toothed belt, which is guided across a corresponding number of belt pulleys. However, it is also possible to set up such a belt drive in a cascaded arrangement, in which case a separate toothed belt is provided for every pair of shafts.

Belt pulleys are usually provided with a so-called flange, which prevents the toothed belt from slipping sideways off the belt pulley during operation.

The majority of belt drives used these days are designed for dry operation, in other words without lubricant, although from developments in the motor industry, there is a foreseeable trend which indicates that a greater number of control drives, compensating shafts or auxiliary drives, for example, may be driven by so-called wet-running belts in future, in other words toothed belts which are wetted by a lubricant, not least because these belt drives are used in combination with conventional gear drives in which lubricant is used with a view to reducing wear.

SUMMARY OF THE INVENTION

The objective of this invention is to propose a belt pulley for wet belt applications which has improved meshing kinematics.

This objective is achieved on the basis of a belt pulley of the type outlined above, in which grooves are provided in the region of the tooth gap base and/or on an inner surface of the flange facing the toothing in order to drain away a lubricant. The hydrodynamic behavior of the wet driven belt system can be improved with the aid of these grooves because they act as drainage channels for the lubricant, which is transmitted by the toothed belt onto the belt pulley or is transferred to it by dipping the belt pulley into a lubricant bath so that this lubricant, in particular lubricating oil, can be transported away from the region of the belt pulley having been squeezed out due to the meshing of the toothed belt with the belt pulley, thereby resulting in better meshing of the toothed belt on the belt pulley, i.e. with the toothing, on the one hand, and reducing the friction power of the oil mist on the other hand.

In one embodiment of the invention, the grooves may be disposed centrally in the tooth gap base between two respective teeth, and in particular, these grooves are disposed at the lowest point of the tooth gap base, thereby making the oil easier to force out and drain away.

Continuous recesses extending in the axial direction may also be provided in the flange(s) in the region of the grooves in the tooth gap base so that the oil is at least partially transported away from the region where the toothed belt meshes with the belt pulley through these recesses in the flange or flanges.

This being the case, these continuous recesses may be of a slot-type design so that the flange or flanges are of an at least almost segment-type design in this region of the toothing. It is therefore possible to drain away a larger volume of lubricant using the centrifugal force acting on the lubricant in the region of these slot-type recesses.

The grooves in the flange(s) may be of an arcuate shape, in which case the open end of the grooves in the region of the end face(s) of the flange or flanges is specifically directed opposite the direction in which the belt pulley circulates in the installed position, likewise enabling the centrifugal force to assist with draining the lubricant, and the lubricant fed away through the open end of the grooves extending opposite the circulating direction can be fed away to the external surface of the toothed belt, thereby providing additional lubrication for the toothed belt.

Another option is for the flange(s) to be inclined in the region of an end face on the side facing the toothing in order to make it easier to remove the lubricant from the meshing region between the toothed belt and belt pulley.

The grooves may have stepped edges in order to make it easier for the lubricant to get into these grooves.

The pulley body and/or the flange(s) are made from a sintered material in particular because this makes it easier to manufacture these components whilst incorporating the grooves without having to undertake additional finishing work on the blanks, as would be necessary in the case of an injection moulded part.

BRIEF DESCRIPTION OF THE DRAWINGS

To provide a clearer understanding, the invention will be described in more detail with reference to the appended drawings. The drawings are schematically simplified diagrams showing:

FIG. 4 a side view of a different embodiment of a flange with grooves;

FIG. 5 a side view of a flange with grooves of an arcuate shape;

DETAILED DESCRIPTION OF PREFERRED EMBODIMENTS

Figure 1:
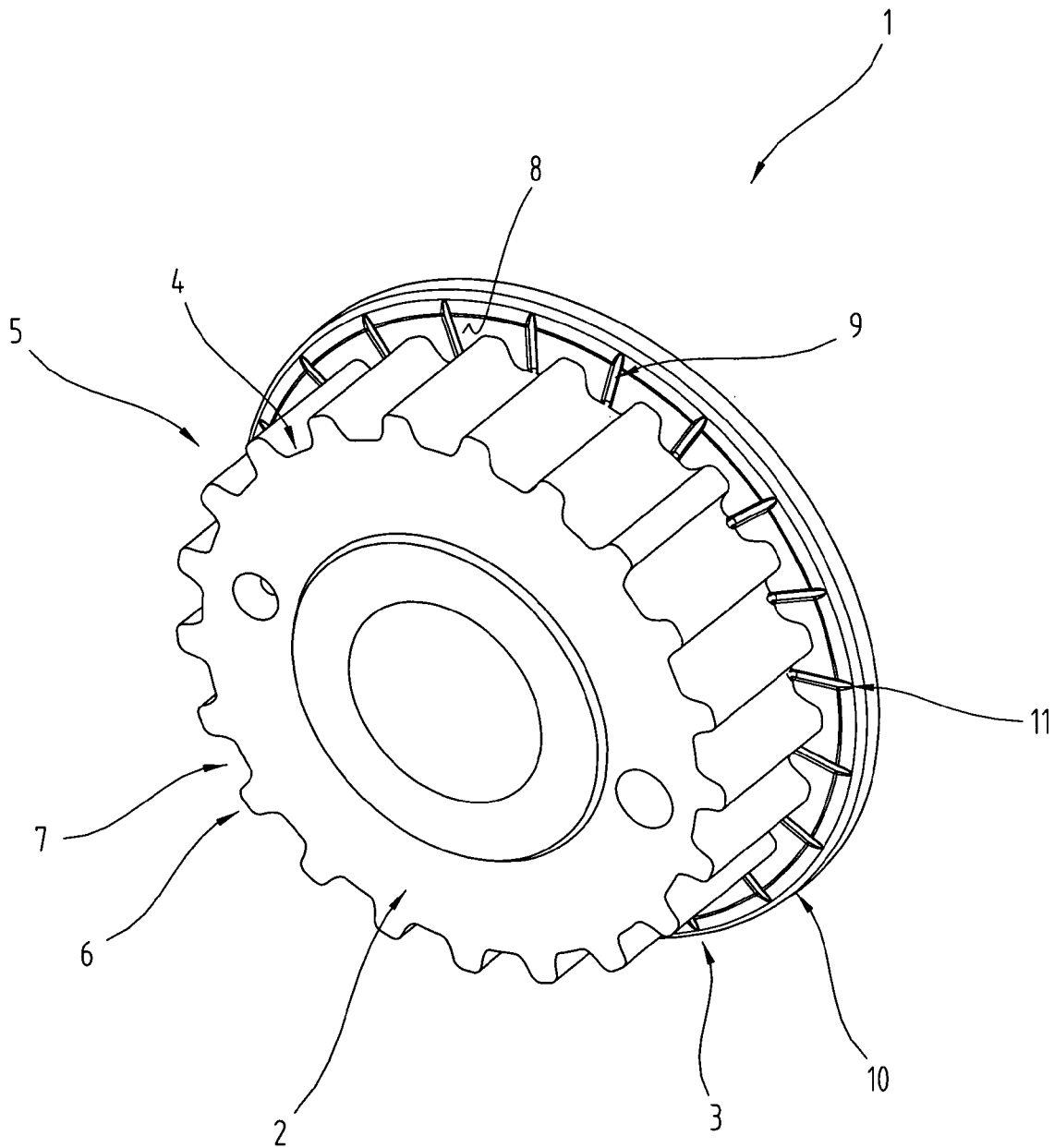
FIG. 1 a view at an angle illustrating a belt pulley with a flange incorporating grooves.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

FIG. 1 is a view of a belt pulley 1 seen from an angle. This belt pulley 1 comprises a pulley body 2, as well as a flange 3, which in this embodiment is provided in the form of a flange disc. The flange 3 is disposed on a side face of the pulley body 2.

The pulley body 2 has toothing 5 on an end face 4. This toothing is provided in the form of teeth 6, between which tooth gaps 7 are disposed. The geometry of the teeth 6 and the geometry of the tooth gaps 7 are designed to mesh with a toothed belt. Since belt pulleys 1 are already known from the prior art in terms of their geometric design, in particular those aspects which differ from chain pulleys and gear pulleys for chain drives and gear drives, there is no need for further explanation in this respect and the person skilled in the art need merely refer to the relevant background literature such as "Dubbel, Taschenbuch für den Maschinenbau, 15th edition, 1983, Springer Verlag", for example.

In the case of this embodiment of the belt pulley 1 proposed by the invention, grooves 9 are provided on an inner surface 8 of the flange 3 in the region of the tooth gaps 7. In particular, a groove 9 is provided for each tooth gap 7. These grooves 9 have a radial contour in this embodiment and are provided with an open end 11 in the direction of an end face 10 of the flange 3.

The pulley body 2 and the flange 3 are preferably manufactured from sintered components, and the sintering process involves—in a known manner—mixing a sinter powder with various other optional additives, such as lubricant, etc., in order to facilitate the capacity of the sintered component to deform, and then pressing the sinter powder in a pressing die to form a blank and sintering the blank at a sinter temperature which will depend on the metal powder or metallic powder used. Sinter powders are usually metal powders or metallic powders for sinter alloys and may also be powders already alloyed beforehand. After the sintering process, the sintered component may optionally undergo a calibration in order to increase the dimensional accuracy.

In terms of sinter powder or sinter alloy powder, it is possible to use a sintering iron or a sintering steel or a powder conforming to standard SINT E 35, SINT E 36, SINT E 39, or alternatively other sinter (alloy) powders known from the prior art.

Another option is for the flange 3 to be an integral component with the pulley body 2 of the belt pulley 1, which obviates the need for an additional process to attach the flange 3 to the pulley body 2 by additional means such as weld spots or welding, or screws, etc.

Although it is preferable to manufacture the belt pulley 1 by sintering, it would also be possible in principle to manufacture this belt pulley 1 by other production methods, for example by casting or injection moulding techniques. However, sintering technology offers the option of simplifying production of the belt pulley 1, especially when it comes to forming the grooves 9, in which case there may be no need for mechanical finishing processes to form the grooves 9 or to clean them.

Figure 2:
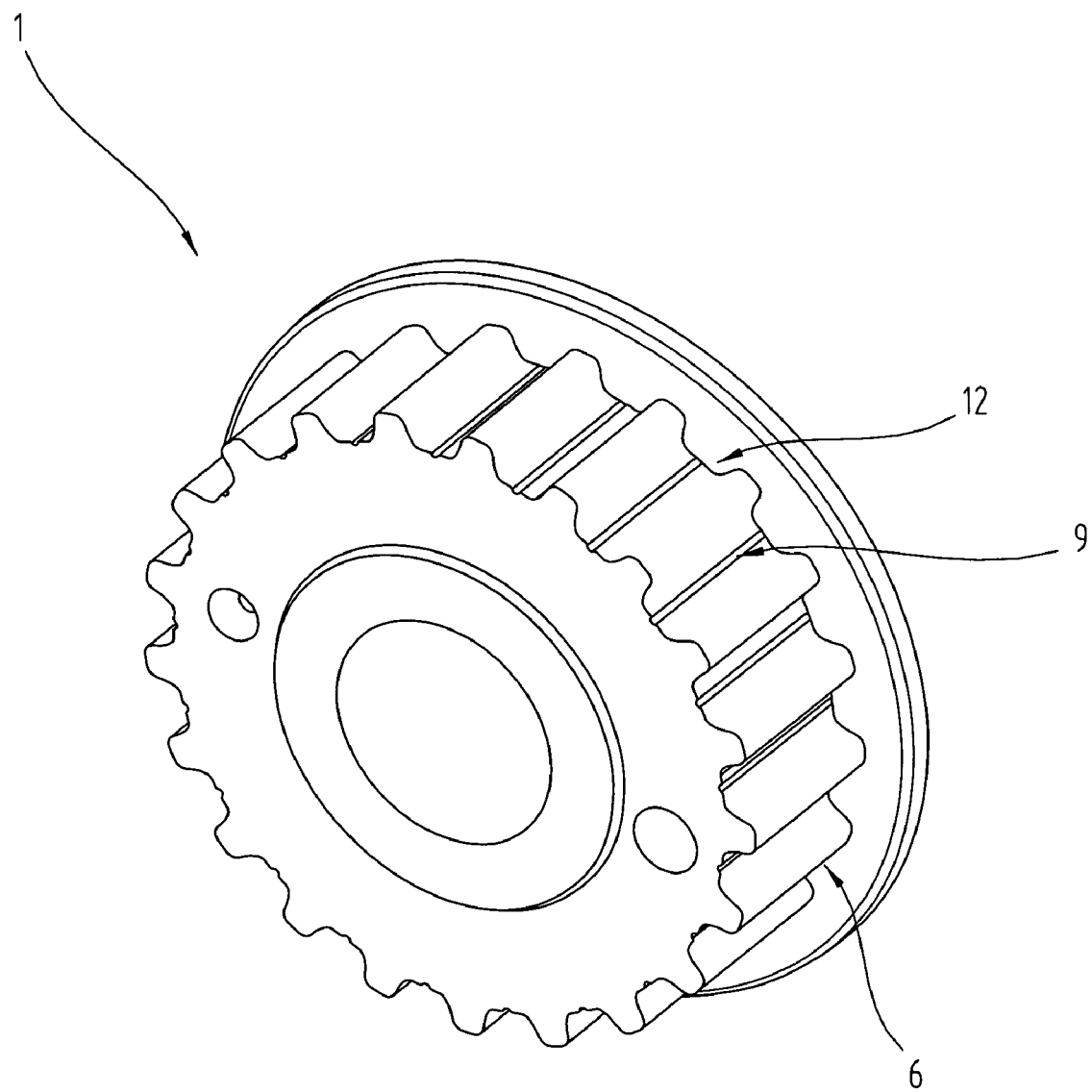
FIG. 2 a view from an angle illustrating a belt pulley with grooves in the region of the tooth gap base.

FIG. 2 illustrates a different embodiment from the belt pulley 1 illustrated in FIG. 1, where the grooves 9 are not disposed on the inner surface 8 of the flange 3 but in a tooth gap base 12. In particular, one groove 9 is again provided for each tooth gap base 12 between two teeth 6. This groove 9 preferably extends across the entire width of the end face 4 of the pulley body 2.

In a different version, although not illustrated, the belt pulley 1 does not have a flange 3 and the grooves 9 are disposed in the tooth gap bases 12.

Figure 3:
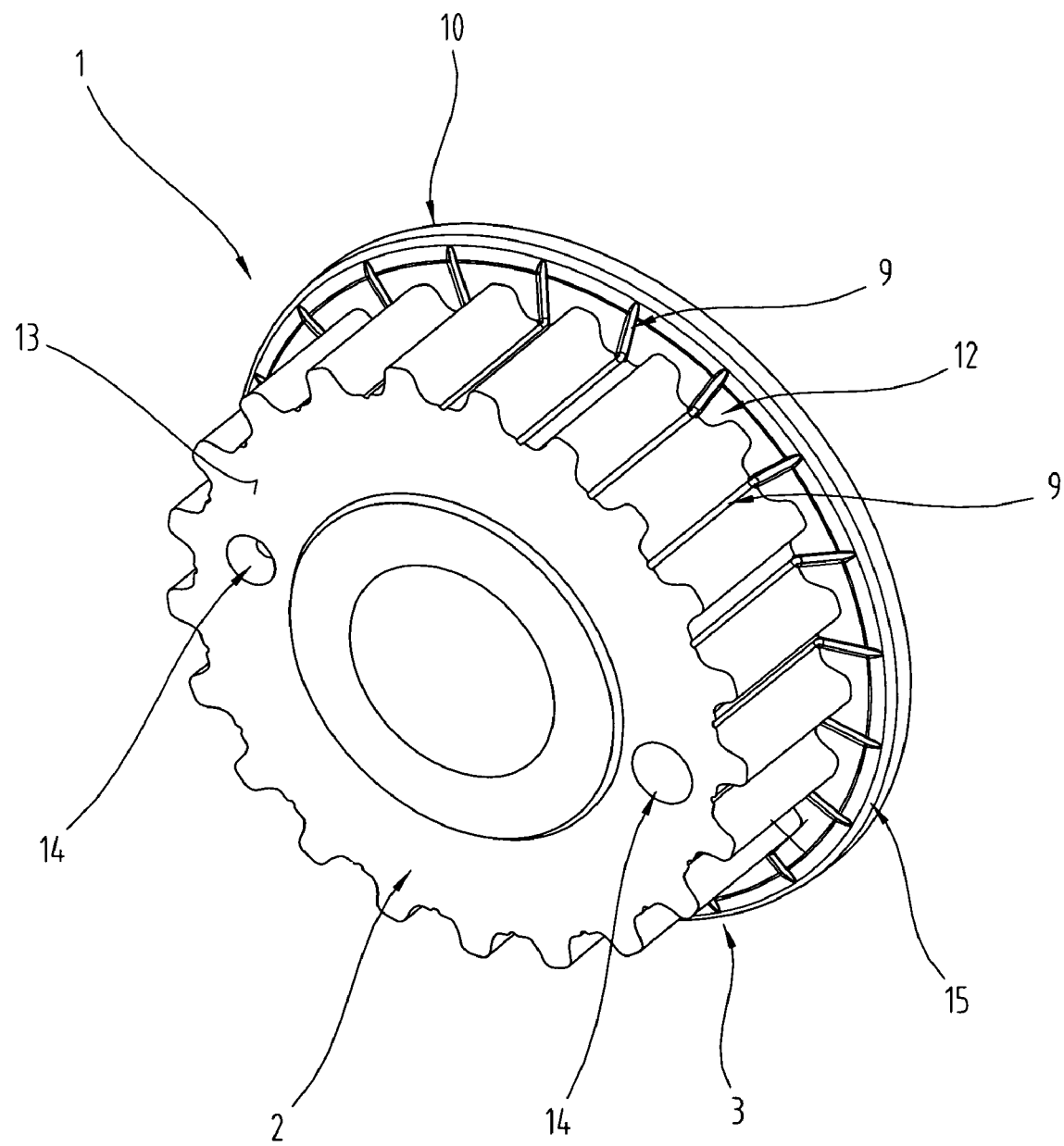
FIG. 3 a different embodiment of a belt pulley with a flange seen from an angle, with grooves in the flange and in the tooth gap base.

In the embodiment illustrated in FIG. 3, the grooves 9 are provided both in the flange 3, i.e. on its inner surface 8 facing the toothing 5, and in the tooth gap base 12 of the pulley body 2. The grooves 9 in the flange 3 are preferably disposed in the contour of the grooves 9 in the tooth gap base 12 so that the oil to be forced out of the grooves 9 in the tooth gap base 12 can flow into the grooves 9 in the flange 3 and through them out of the region where the toothed belt meshes with the belt pulley 1. Naturally, however, it would also be possible to opt for an arrangement in which the grooves 9 in the flange 3 are offset from the grooves 9 in the tooth gap base 12, although this is not the preferred embodiment of the invention.

As may be seen from FIGS. 1 to 3, two recesses 14 are provided lying opposite one another in the radial direction in a side surface 13 of the pulley body 2 for locating a clamping tool for the toothed belt drive. These two recesses 14 may be of differing geometry in order to ensure that the tool is correctly located, and it would also be possible to provide several recesses 14, i.e. more than two, on or in the surface 13 to enable the toothed belt to be clamped.

The width of the end face 4 of the pulley body 2 is preferably dimensioned so that it is bigger than the width of the toothed belt, thereby allowing the toothed belt circulating on the belt pulley 1 to shift laterally within certain limits.

Figure 6:
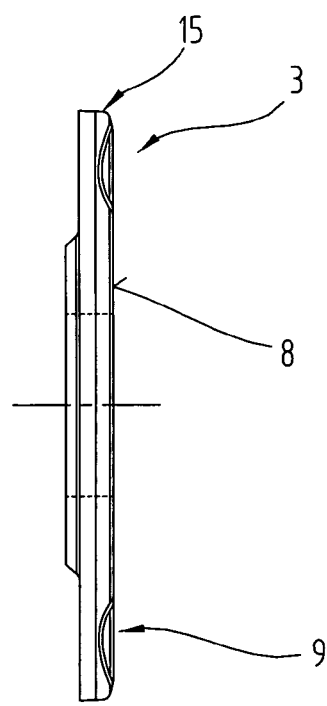
FIG. 6 a side view in section of a flange with grooves extending in a curve.

In the embodiments illustrated in FIGS. 1 to 3, the flange 3, i.e. the flange ring, has an inclined surface 15 (FIG. 3) in the region of the end face 7, which may also be seen more clearly in FIG. 6. In other words, the flange is stepped in the region of the end face 10 of the flange 3. This inclined surface 15 is designed so that the cross-section of the flange 3 tapers in the direction towards its end face 10. This inclined surface 15 on the one hand prevents damage to the toothed belt due to sharp edges and on the other hand makes it easier for the lubricant to move out of the grooves 9.

The flanges and transitions between the inclined surface 15 and the end face 10 or the inclined surface 15 and the region of the flange 3 lying underneath in the radial direction may also be rounded, which will result in a further improvement.

Another option is to provide the grooves 9 with inclined surfaces or stepped or rounded edges as well, which will again prevent damage to the toothed belt and make it easier for the lubricant to get into the grooves 9.

The grooves 9 may be of any cross-sectional shape, for example rectangular, square, triangular or similar, but it is preferable for these grooves 9 to be provided with a rounded cross-section, in which case the rounding in the groove base may have a bigger radius than the radius in the region where the inner surface 8 of the flange merges into the groove 9. The same also applies to the grooves 9 in the tooth gap base 12.

In the embodiments described as examples and illustrated in FIGS. 1 to 3 so far, the grooves 9 in the flange 3 extend into the end face 10 of the flange 3.

By contrast, FIG. 4 illustrates an embodiment of a flange 3 where the grooves 9 do not extend into the region of the end face 10 of the flange 3. In FIG. 4, the pulley body 2 is also shown by broken lines. These grooves 9 extend starting from the tooth gap base 12 in the radial direction towards the end face 12 and terminate at a distance 16 from this end face 10. As a result, not all the lubricant drains out of the region where the toothed belt meshes with the belt pulley 1 and instead it is fed above the toothed belt—a toothed belt portion 17 is illustrated by broken lines in FIG. 4—and onto it in order to provide the toothed belt with additional lubrication. To this end, the distance 16 is selected so that the end 11 is disposed above the toothed belt, in other words the distance 16 is shorter than a distance 18 between the toothed belt and the end face 10 of the flange 3.

The embodiment illustrated in FIG. 5 illustrates a side view of a flange 3, and the grooves 9 follow a curved contour. The disposition of these curved grooves 9 is basically reminiscent of a turbine wheel, with the grooves 9 taking the place of the blades. The ends 11 of the grooves 9 are inclined in the direction opposite the direction (arrow 19) in which the belt pulley 1 circulates in the fitted state. This curvature is conducive to draining the lubricant due to the centrifugal force acting on the lubricant caused by the rotation of the belt pulley 1 and the lubricant is "flung" onto the respective following surfaces of the toothed belt, again in order to provide this toothed belt with additional lubrication.

FIG. 6 illustrates an embodiment of the flange 3 where the grooves 9 likewise have a curvature, although this curvature is created by the fact that the grooves 9 occupy a different depth in the body of the flange 3 across their course. For example, the grooves 9 may have the shape of a circle arc segment. This means that the lubricant located in these grooves 9 is deflected in the direction towards the inner surface 8 of the flange 3 and on leaving the groove 9 thus emerges above the end face 4 of the pulley body 2 (FIG. 1) and is again able to get onto the external surface of the toothed belt in order to lubricate it.

Figure 7:
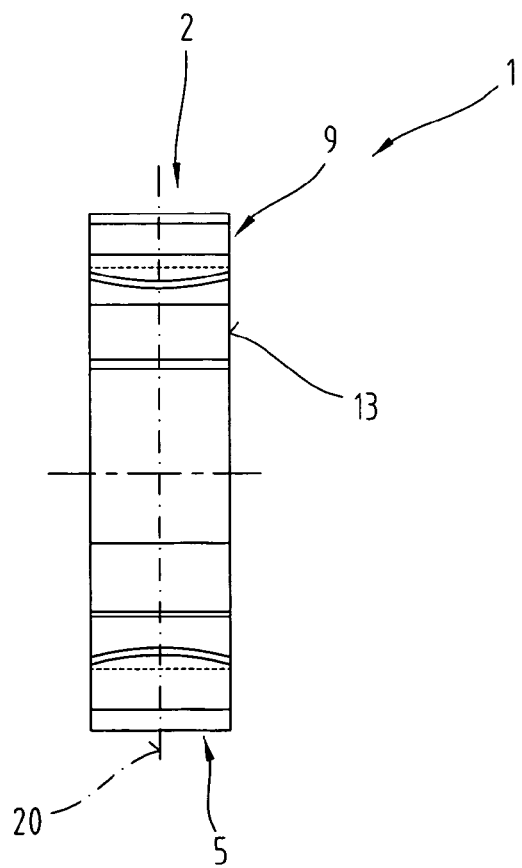
FIG. 7 a view from the end face showing a belt pulley, in section, with grooves extending in a curve.

The embodiment illustrated in FIG. 7 also has grooves 9 with a curved contour, but in the pulley body 2 of the belt pulley 1. This also improves the drainage of lubricant from the meshing region between the toothed belt and belt pulley 1 or toothing 5. In this embodiment, the deepest point of the grooves 9 is in a centrally extending cross-sectional plane 20 running parallel with the surface 13 of the pulley body 2.

Figure 8:
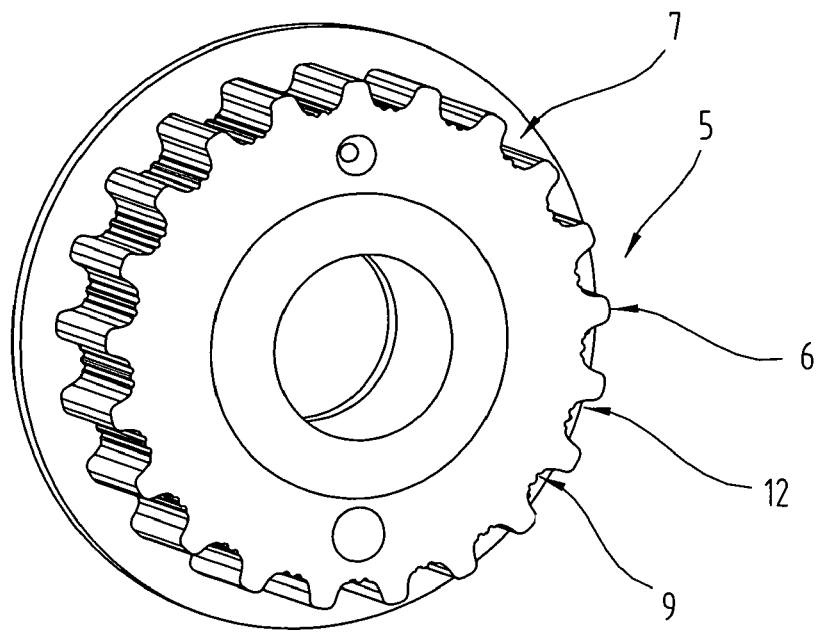
FIG. 8 another embodiment of a belt pulley with a flange, seen from a side view, with two grooves in the tooth gap base.
Figure 9:
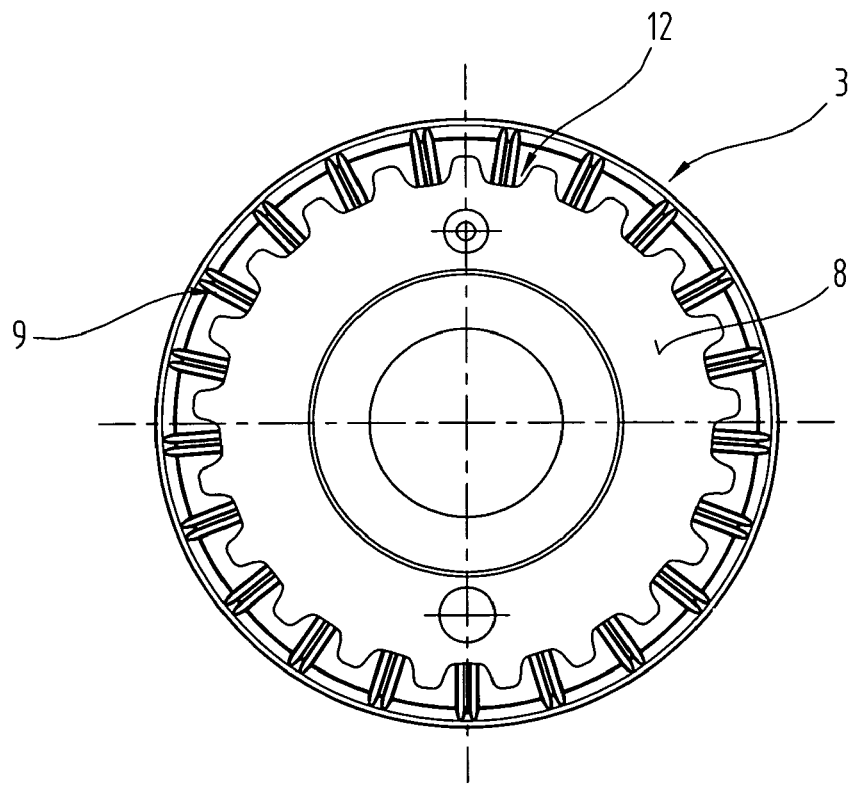
FIG. 9 another embodiment of a belt pulley with a flange with two grooves per tooth gap in the flange.

In the embodiments described so far, one groove 9 is provided respectively for every tooth gap 7. As illustrated in FIGS. 8 and 9, however, it is also possible to provide several grooves 9 per tooth gap 7 in the region of the tooth gap bases 12 on the one hand, for example two as illustrated in FIG. 8, and these grooves 9 are no longer disposed centrally between two teeth 6 of the toothing 5 as was the case with the previous embodiments, but are in a position offset from the centre. In this respect, FIG. 9 illustrates another possible variant in which the two grooves 9 provided per tooth gap 12 are disposed in the flange 3, i.e. the inner surface 8 of the flange 3. It would naturally also be possible to provide more than two grooves, both in the pulley body 2 and in the flange 3.

At this stage, it should be pointed out that the central disposition of the grooves 9 in either only the groove 9 in the pulley body 2 and/or the flange 3 is not absolutely necessary—although this is the preferred variant—and accordingly it may optionally be of advantage to opt for an eccentric disposition between two teeth 6 of the toothing 5.

Figure 10:
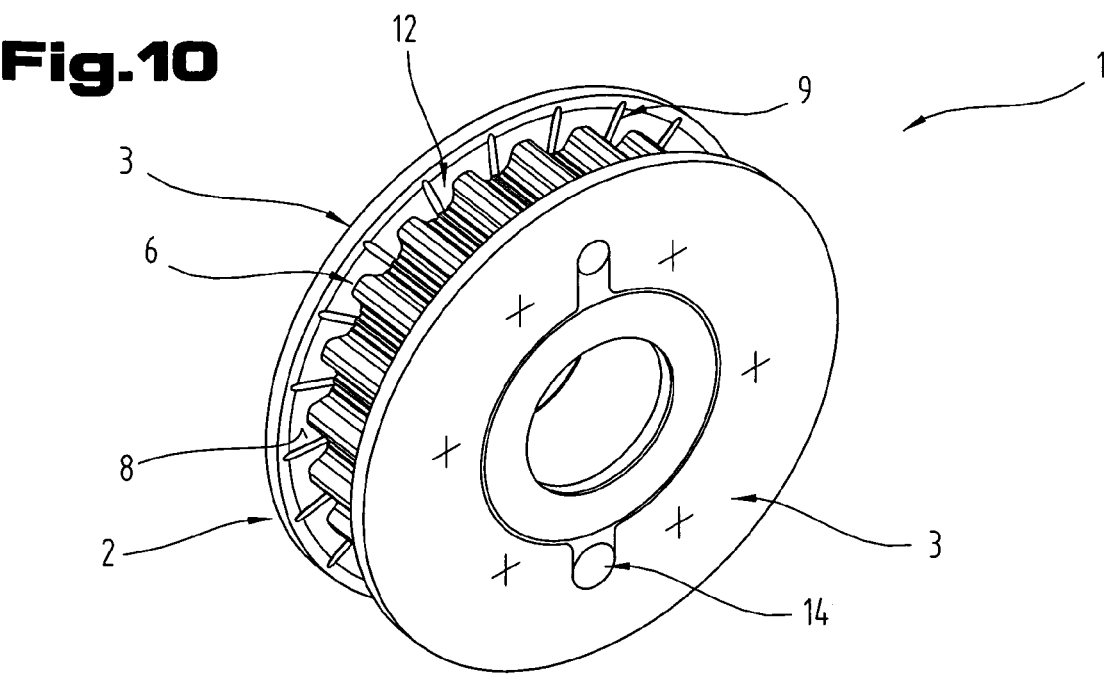
FIG. 10 a view from an angle showing a belt pulley with two flanges.

FIG. 10 illustrates an embodiment of the belt pulley 1 where the pulley body 2 is bounded in the axial direction by a flange 3 in each case, i.e. a flange ring. Both flanges 3 may have grooves in their inner surfaces 8 and the grooves 9 may also be disposed in the pulley body 2 between two teeth 6 in the tooth gap base 12. Again with this embodiment, it is possible to manufacture the flanges 3 and the pulley body 2 separately and then attach them using additional aids on the pulley body 2 such as screws or, another option is to make at least one flange 3 integrally with the pulley body 2 and connect the second flange 3 to the pulley body 2 by weld spots (denoted by X in FIG. 10), for example. Yet another option is to use a pressing die of an appropriate design with die halves which can be displaced laterally—in the radial direction of the belt pulley 1—and make both flanges 3 integrally with the pulley body 2.

The second flange 3 illustrated in FIG. 10 may have corresponding recesses in the region of the recesses 14 in the pulley body 2, i.e. its surface 13 (FIG. 7), to permit access to the recess 14 if this flange is manufactured separately and connected to the pulley body 2 in an additional operation.

Figure 11:
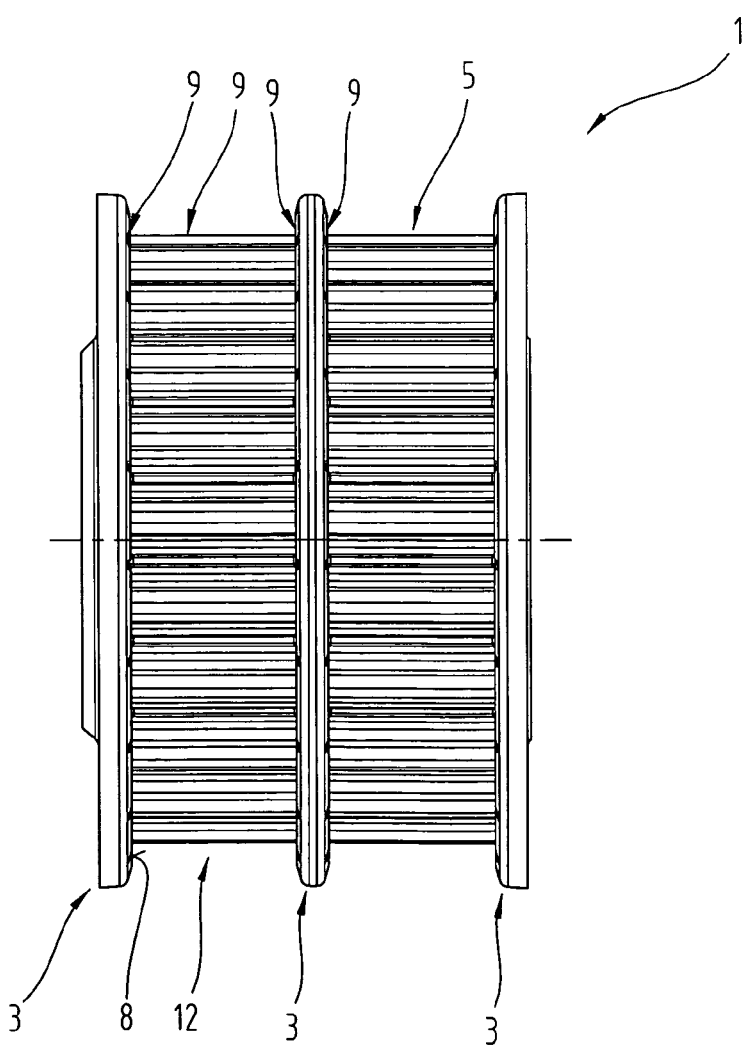
FIG. 11 another embodiment of a belt pulley with flanges for fitting toothed belts.

FIG. 11 illustrates an embodiment in which the belt pulley 1 is designed for more than one toothed belt, in which case this embodiment is provided with three flanges 3 comprising two outer flanges 3 and a flange 3 lying in between, which separates the two regions where the two toothed belts mesh with the toothing 5 of the belt pulley 1 from one another. Again in this embodiment, grooves 9 are provided in the inner surfaces 8 of the flanges 3 and/or in the region of the tooth gap bases 12 of the toothing 5 and in this embodiment, the inner flange 3 disposed between the two outer flanges 3 does not have grooves 9 or, another option is to provide these grooves 9 on at least one surface of the inner flange 3, preferably on the two oppositely lying surfaces.

Figure 12:
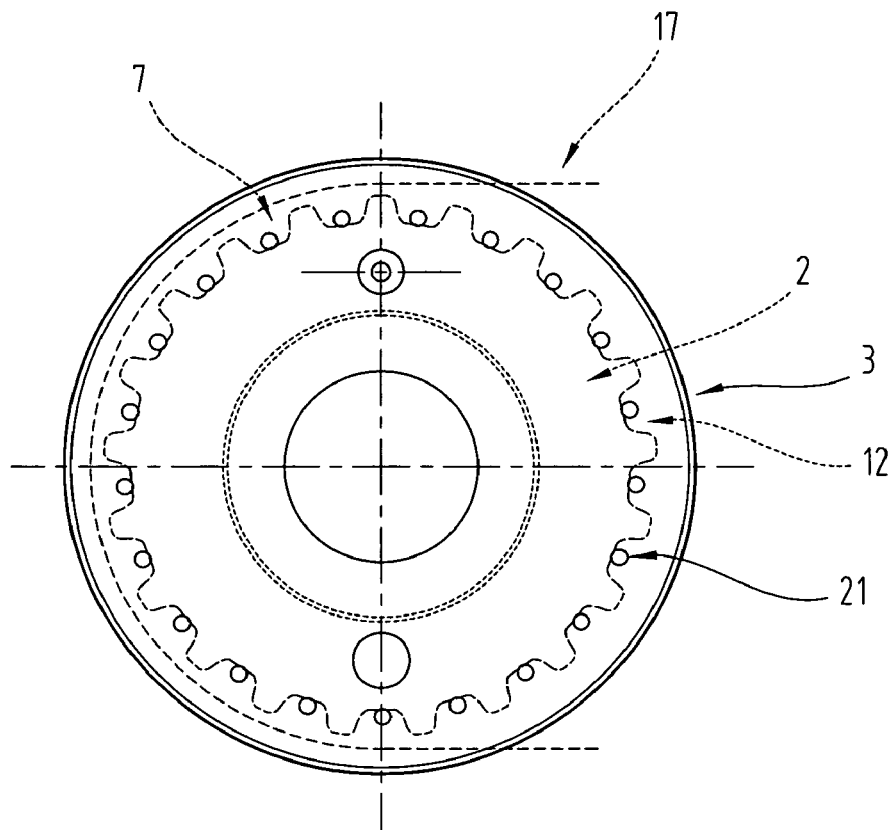
FIG. 12 another embodiment of a belt pulley in which bores are provided in the flange.

FIG. 12 illustrates an embodiment in which bores 21 are provided in the flange 3 instead of the grooves 9, and these bores extend end-to-end through the flange 3. It is preferable to provide at least one bore 21, although it would also be possible to provide more than one bore 21, per tooth gap 7—the pulley body 2 and the toothed belt portion 17 are again indicated by broken lines. In this embodiment, the lubricant does not drain via inner grooves 9 in the flange 3 but through these bores 21 into an external region of the belt pulley 1 (FIG. 1). By preference, the bores 21 are disposed on a level with the tooth gap bases 12 in the region of the grooves 9.

Figure 13:
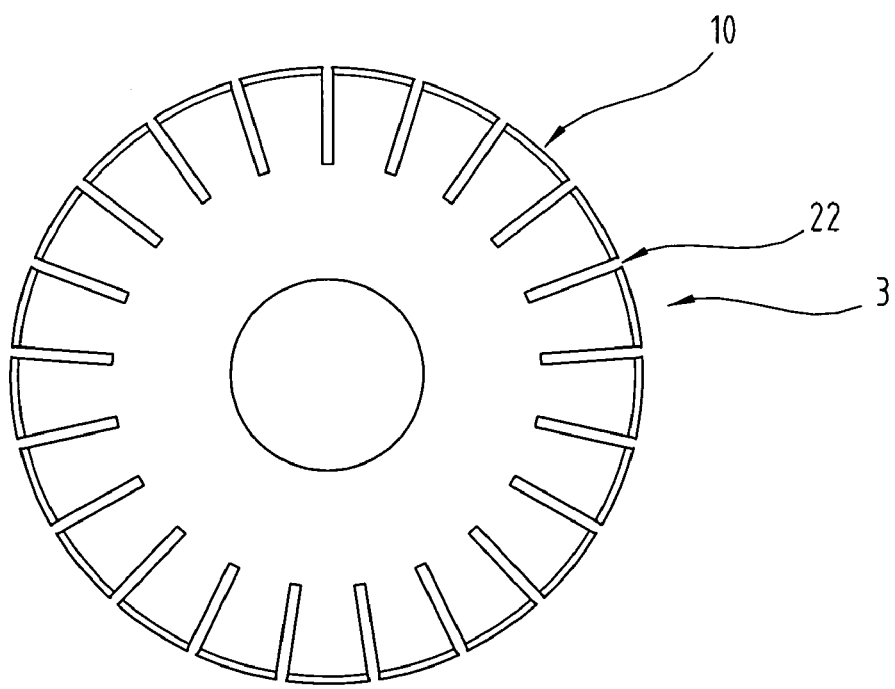
FIG. 13 another embodiment of a belt pulley in which slots are provided in the flange.

In the embodiment illustrated in FIG. 13, finally, these recesses are provided in the flange 3 in the form of slots 22 or are of a slot-type design so that the flange 3 is formed by a segment-type arrangement in the region of the end face 10. These slots 22 preferably extend from the end face 10 into the region of the tooth gap bases 12 (e.g. FIG. 8) between the teeth 6 (FIG. 1) of the pulley body 2.

Other embodiments are also possible, for example a combination of groove 9 and bore 21 or slot 22 in the flange 3, in which case the grooves 9 merge into these bores 21 or slots 22 through the pulley body 2 at a pre-definable height. Other ways of draining the lubricant out of the meshing region of the toothed belt/toothing 5 region are possible.

Another option is for the belt pulley 1 with the flange(s) 3 to be made up of components manufactured in different ways, in which case the pulley body 2 may be made from a sintered material, for example, and the flanges by a deep-drawing process or the pulley body may be made with one flange 3 and the other flange 3 may be a deep-drawn component.

The belt pulley 1 proposed by the invention may be used in particular for control drives, auxiliary drives and compensating shafts in the automotive industry or the motor sector.

The embodiments illustrated as examples represent possible design variants of the belt pulley 1 and the pulley body 2 and flange 3, and it should be pointed out at this stage that the invention is not specifically limited to the design variants specifically illustrated, and instead the individual design variants may be used in different combinations with one another and these possible variations lie within the reach of the person skilled in this technical field given the disclosed technical teaching. Accordingly, all conceivable design variants which can be obtained by combining individual details of the design variants described and illustrated are possible and fall within the scope of the invention.

For the sake of good order, finally, it should be pointed out that, in order to provide a clearer understanding of the structure of the belt pulley 1 and the pulley body 2 and flange 3, they and their constituent parts are illustrated to a certain extent out of scale and/or on an enlarged scale and/or on a reduced scale.

The objective underlying the independent inventive solutions may be found in the description.

Above all, the individual embodiments of the subject matter illustrated in FIGS. 1; 2; 3; 3; 4; 5; 6; 7; 8; 9; 10; 11; 12 constitute independent solutions proposed by the invention in their own right. The objectives and associated solutions proposed by the invention may be found in the detailed descriptions of these drawings.

LIST OF REFERENCE NUMBERS

1 Belt pulley
2 Wheel body
3 Edge
4 End face
5 Toothing
6 Tooth
7 Tooth gap
8 Surface
9 Groove
10 End face
11 End
12 Tooth gap base
13 Surface
14 Recess
15 Inclined surface
16 Distance
17 Toothed belt portion
18 Distance
19 Circulation direction
20 Cross-sectional plane
21 Bore
22 Slot

What is claimed is:

1. Belt pulley for a wet belt application, with a pulley body comprising toothing incorporating teeth on one pulley body end face for a toothed belt, a tooth gap with a tooth gap base being disposed between every two teeth, wherein the geometry of the teeth and the geometry of the tooth gaps are designed to mesh with the toothed belt, and having a flange which is disposed—in the axial direction—on the side of the pulley body and extends to a flange end face beyond the toothing in the radial direction, wherein lubricant grooves are provided in the region of the tooth gap bases and on an inner surface of the flange facing the toothing for feeding away a lubricant, wherein the lubricant grooves on the inner surface of the flange extend toward the flange end face and are provided with an open end in the direction of the flange end face and terminate at a first distance from the flange end face shorter than a second distance between the toothed belt and the flange end face.

2. Belt pulley as claimed in claim 1, wherein the lubricant grooves are disposed in the tooth gap base centrally between two respective teeth.

3. Belt pulley as claimed in claim 1, wherein recesses extending continuously in the axial direction are disposed in the flange in the region of the grooves in the tooth gap base.

4. Belt pulley as claimed in claim 1, wherein the lubricant grooves in the flange are of an arcuate shape.

5. Belt pulley as claimed in claim 1, wherein the flange is angled in the region of an end face on the side facing the toothing.

6. Belt pulley as claimed in claim 1, wherein the lubricant grooves have stepped edges.

7. Belt pulley as claimed in claim 1, wherein at least one of the pulley body and the flange is made from a sintered material.

8. Belt pulley as claimed in claim 1, wherein a second flange is disposed—in the axial direction—on the other side of the pulley body and extends beyond the toothing in the radial direction, wherein lubricant grooves are provided on an inner surface of the second flange facing the toothing for feeding away a lubricant, the second flange is angled in the region of an end face on the side facing the toothing.

* * * * *